United States Patent [19]

Nobusawa et al.

[11] Patent Number: 4,593,782
[45] Date of Patent: Jun. 10, 1986

[54] SHAFT DRIVE APPARATUS FOR MOTOR VEHICLES

[75] Inventors: Hiroshi Nobusawa; Eiji Hosoya; Masahiro Imaizumi, all of Saitama; Hitoyuki Takasu, Tokyo, all of Japan

[73] Assignee: Honda Giken Kogyo Kabushiki Kaisha, Tokyo, Japan

[21] Appl. No.: 639,166

[22] Filed: Aug. 8, 1984

[30] Foreign Application Priority Data

Aug. 8, 1983 [JP] Japan .................. 58-144816

[51] Int. Cl.$^4$ .............................................. B60G 9/00
[52] U.S. Cl. ...................................... 180/88; 180/215
[58] Field of Search ............ 180/88, 215, 226, 62; 74/695, 710, 750 R, 789; 188/18 R, 344

[56] References Cited

U.S. PATENT DOCUMENTS

| | | | |
|---|---|---|---|
| 4,046,211 | 9/1977 | Allen | 180/215 |
| 4,343,375 | 8/1982 | Manning | 180/88 |
| 4,534,440 | 8/1985 | Sekizaki et al. | 180/88 |

Primary Examiner—Richard A. Bertsch
Attorney, Agent, or Firm—Armstrong, Nikaido, Marmelstein & Kubovcik

[57] ABSTRACT

A shaft drive apparatus for transmitting power from an engine through a drive shaft to driving wheels. The shaft drive apparatus has a final output mechanism and a brake mechanism disposed adjacent to each other substantially axially centrally of an axle of the driving wheels, the drive shaft being disposed substantially on a longitudinal central axis of a vehicle body and between the final output mechanism and the brake mechanism.

4 Claims, 3 Drawing Figures

SHAFT DRIVE APPARATUS FOR MOTOR VEHICLES

BACKGROUND OF THE INVENTION

1. Field of the Invention

The present invention relates to a shaft drive apparatus for motor vehicles, and more particularly to an arrangement of a drive shaft.

2. Description of the Prior Art

In shaft-drive motor vehicles, a drive shaft is coupled through a universal joint to the output shaft of an engine and has on an end thereof a bevel gear held in mesh with a bevel gear in a final output mechanism mounted on the axle of driving wheels for transmitting engine power to the driving wheels.

Where such drive apparatus is to be incorporated in a three-wheeled motor vehicle, the drive shaft should preferably be positioned, as much as possible, on the longitudinal central axis of the vehicle body for transverse weight balancing of the vehicle. For off-road three-wheeled vehicles known as three-wheeled buggies, it is necessary that the drive shaft be out of physical interference with bumps on a ground surface.

The present invention has been made to meet the above requirements.

SUMMARY OF THE INVENTION

Accordingly, it is an object of the present invention to achieve well transverse weight balancing of a shaft-drive motor vehicle and also to prevent a drive shaft of the vehicle from interfering with ground bumps.

With this and other objects in view, there is provided according to the present invention a shaft drive apparatus in a motor vehicle having an engine and driving wheels, the shaft drive apparatus including an axle of the driving wheels, a drive shaft for transmitting power from the engine to the axle, and a final output mechanism and a brake mechanism disposed adjacent to each other substantially axially centrally of the axle, the drive shaft being disposed between the final output mechanism and the brake mechanism.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
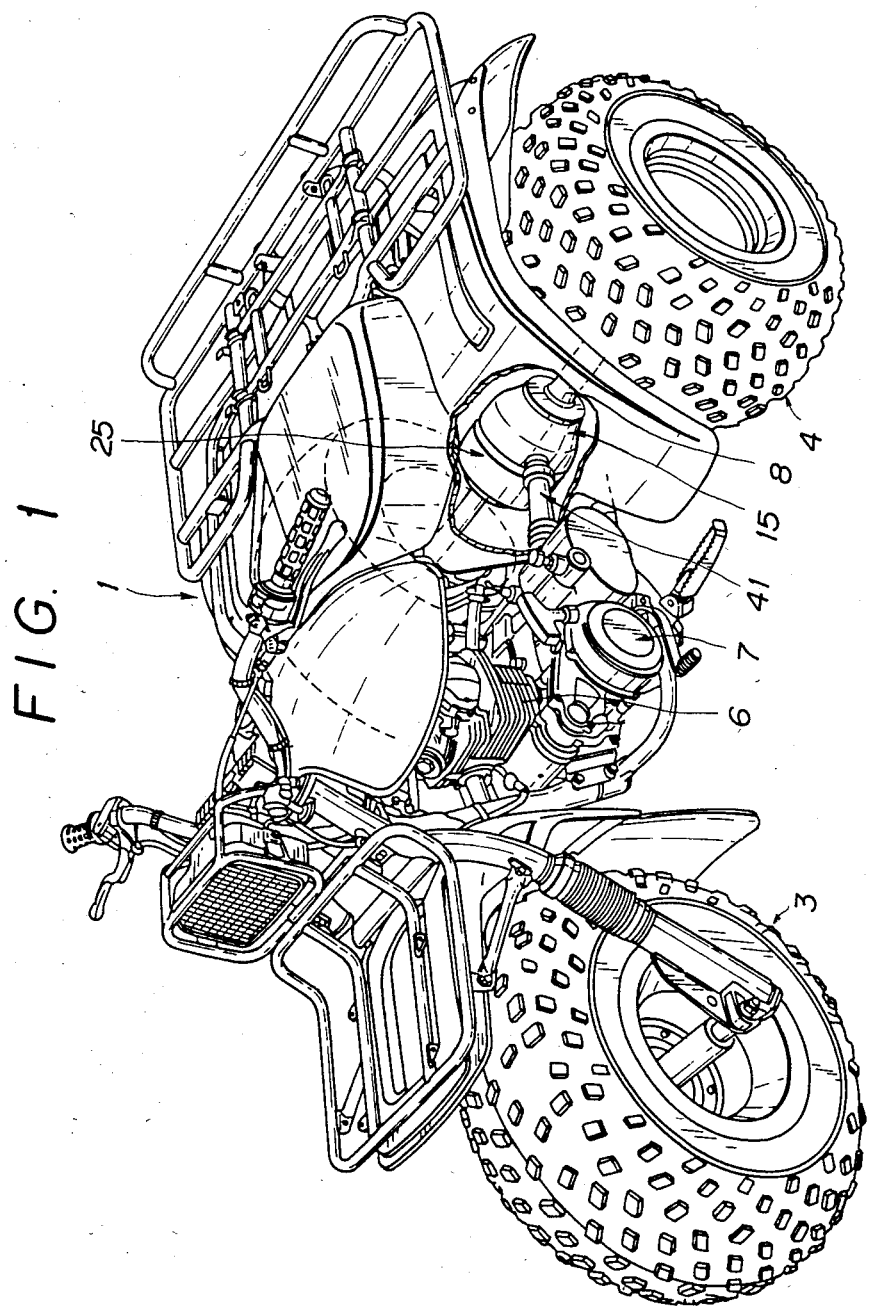
FIG. 1 is a perspective view of a three-wheeled motor vehicle incorporating a shaft drive apparatus according to the present invention.

As shown in FIG. 1, an off-road three-wheeled vehicle known as a three-wheeled buggy has a single front wheel 1, a pair of rear wheels 4, 5 (FIG. 2), and an engine 6 mounted substantially centrally on a vehicle body 2. Drive power from the engine 6 is transmitted through a transmission 7, a drive shaft and a final output mechanism (described later on) to the rear driving wheels 4, 5. The front wheel 3 and the rear wheels 4, 5 comprise low-pressure tires for enabling the motor vehicle to run easily on rough terrain.

Figure 2:
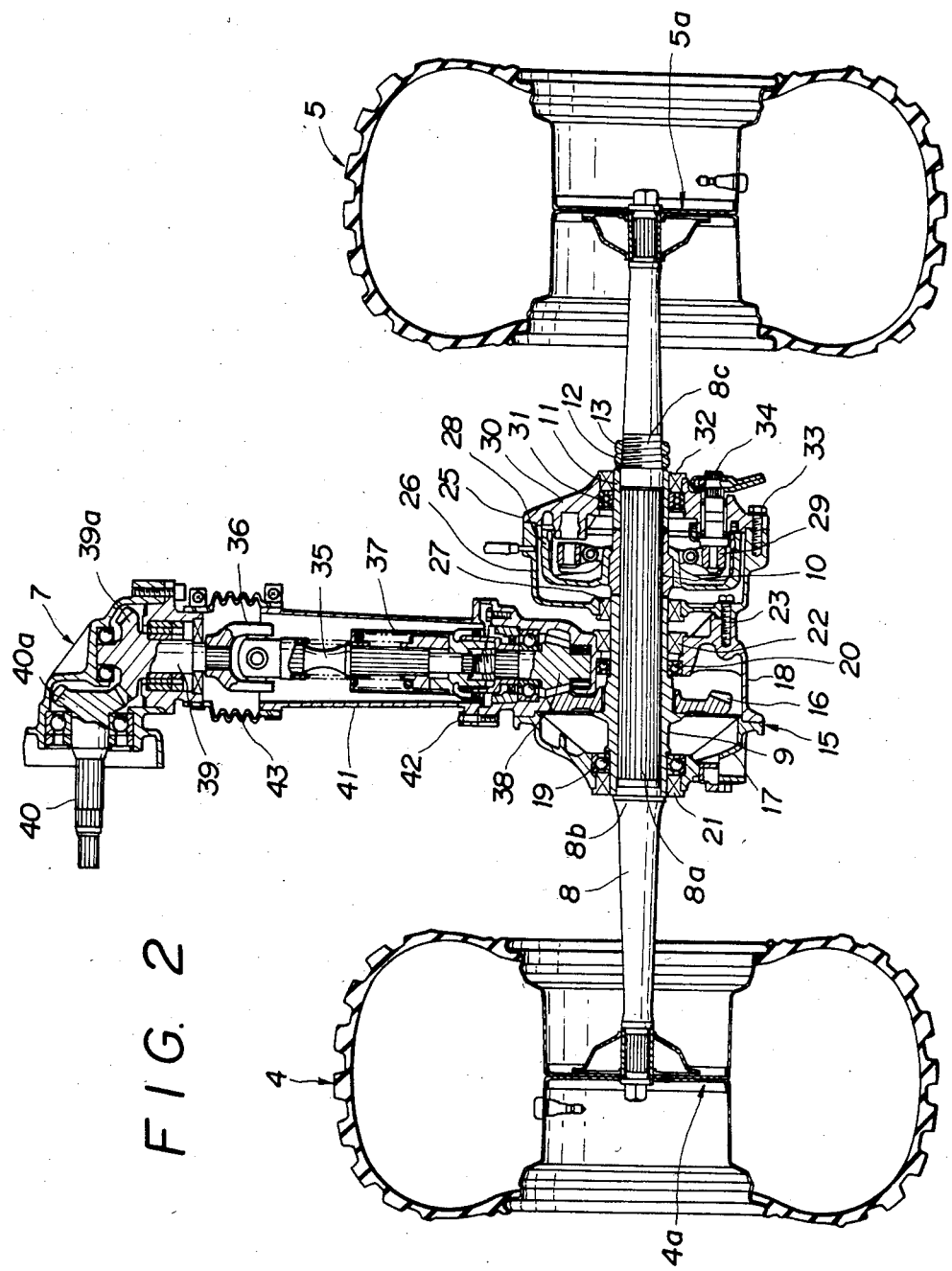
FIG. 2 is a horizontal cross-sectional view of the shaft drive apparatus in the motor vehicle of FIG. 1.

FIG. 2 illustrates a shaft drive apparatus according to the present invention, in the three-wheeled motor vehicle of FIG. 1. Axle collars 9, 10, 11 are axially successively splined to a drive axle 8 on a substantially axially central portion 8a thereof. The axle collars 9, 10, 11 are secured to the drive axle 8 by a stopper 8b on one side of the drive axle 8 and nuts 12, 13 threaded over a threaded portion 8c on an opposite side of the drive axle 8. The driving wheels 4, 5 have hubs 4a, 5a, respectively, fixedly mounted on the opposite ends of the drive axle 8.

On the axle collars 9, 10, 11, there are mounted a final output mechanism 15 and a brake mechanism 25. The final output mechanism 15 has a bevel gear 16 fixedly fitted over the axle collar 9 on a substantially axially central portion thereof, and final gear case half members 17, 18 rotatably mounted on the axle collar 9 by bearings 19, 20, respectively, one on each side of the bevel gear 15. Seal members 21, 22 are interposed between the final gear case half members 17, 18 and the axle collar 9. The final gear case half members 17, 18 are interconnected by bolts (not shown).

The brake mechanism 25 has a drum case 26, a drum 28, a brake panel 30, and a brake shoe 29. The brake drum case 26 is mounted by a seal member 27 on one end of the axle collar 9 and fixed by a bolt 28 to the final gear case half member 18. The brake drum 28 is fixedly fitted over the axle collar 10 and loosely fitted in the brake drum case 26. The brake panel 30 is mounted by a bearing 31 on the axle collar 11, with a seal member 32 interposed between the brake panel 30 and the axle collar 11. The brake drum case 26 and the brake panel 30 are fastened together by a bolt 33.

The brake shoe 29 is mounted in the brake drum 28 and held in engagement with a rear brake cam 34 coupled to the brake panel 30 and to a brake pedal (not shown) through a link mechanism (not shown). In response to depression of the brake pedal, the rear brake cam 34 is turned against a spring force to spread and press the brake shoe 29 against an inner peripheral surface of the brake drum 28, thus braking the brake drum 28 and hence the drive axle 8 and the driving wheels 4, 5.

A drive shaft 35 is disposed substantially on a longitudinal central axis of the vehicle body between the final output mechanism 15 and the brake mechanism 25. The drive shaft 35 has one end splined to an end of a universal joint 36 and an opposite end engaging a bevel gear 38 through a cam damper 37. The bevel gear 38 is rotatably supported on the final gear case half member 18 between the bevel gear 16 and the brake drum 28, and held in driving mesh with the bevel gear 16. The other end of the universal joint 36 is splined to an output shaft 39 of the transmission 7, the output shaft 39 being coupled to a crank shaft of the engine 6 through bevel gears 39a, 40a, an intermediate shaft 40, and a gear train (described later on) in the transmission 7.

The drive shaft 35 loosely extends through a substantially tubular drive shaft cover 41 having one end fastened by a bolt 42 to the final gear case half members 17, 18 of the final output mechanism 15 and an opposite end secured by a joint boot 43 to the transmission 7. The drive shaft cover 41 thus serves to protect the drive shaft 35.

The final output mechanism 15 and the brake mechanism 25 are thus disposed adjacent to each other substantially axially centrally of the drive axle 8, with the drive shaft 35 positioned transversely between the final output mechanism 15 and the brake mechanism 25. The front wheel 3 is positioned on the longitudinal central axis of the vehicle body, so that the drive shaft 35 is situated behind the front wheel 3. The transverse weight of the motor vehicle can be well balanced by positioning the final output mechanism 15 and the brake mechanism 25 adjacent to each other substantially axially centrally of the drive axle 8.

Figure 3:
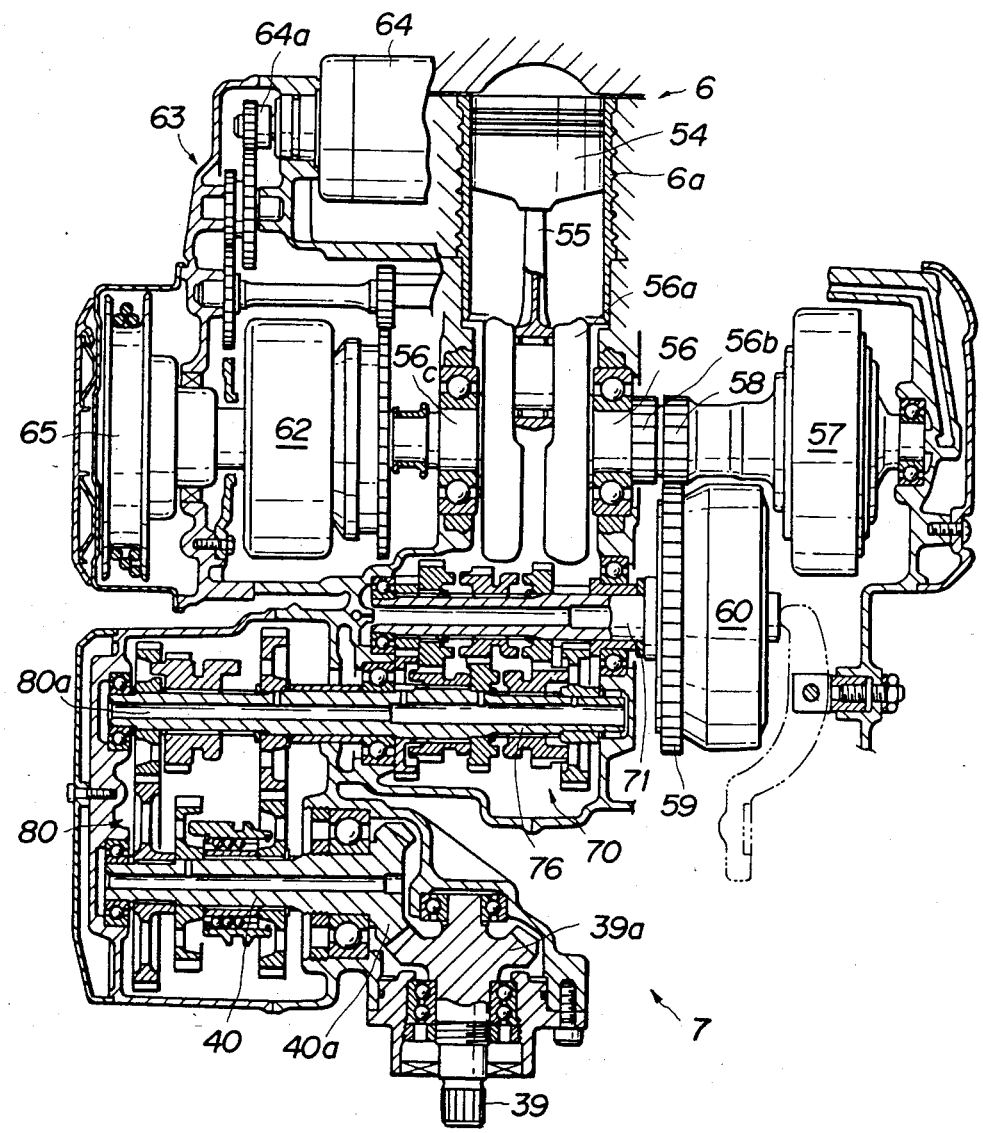
FIG. 3 is a horizontal cross-sectional view of a drive train from an engine to the output shaft of a transmission in the vehicle shown in FIG. 1.

FIG. 3 illustrates a drive train from the engine 6 to the output shaft 39 of the transmission 7. The lower end of the drive train as shown in FIG. 3 is directed rearward of the motor vehicle.

The engine 6 comprises a cylinder 6a, a piston 54 slidably fitted in the cylinder 6a, and a connecting rod 55 supporting the piston 54 and rotatably coupled to a crank 56a of a crank shaft 56 extending transversely of the motor vehicle.

Rotative power of the crank shaft 56 is transmitted from an end 56b thereof through an automatic centrifugal clutch 57 disposed on one side of the engine 6 and having an output gear 58 and a manually operated clutch 60 having an input gear 59 meshing with the output gear 58 of the automatic centrifugal clutch 57 to a main shaft 71 of a primary transmission 70 which is disposed substantially on a longitudinal central axis of the engine 6 and behind the engine 6.

The crank shaft 56 has an opposite end 56c connected to a generator 62 and a recoil starter 65 and also to an output shaft 64a of a starter 64 through a train of gears 63. The recoil starter 65 is used when manually starting the engine 6.

The primary transmission 70 is composed of the main shaft 71, a counter shaft 76 extending parallel to the main shaft 71, and a train of speed-change gears mounted on the main shaft 71 and the counter shaft 76 and coacting with each other. The speed-change gears can be selected by a shift pedal, a shift drum interlinked with the shift pedal, and a shift fork engaging the shift drum, all not shown.

A secondary transmission 80 is disposed on a side of the central axis of the engine 6 which is opposite to the centrifugal clutch 57. The secondary transmission 80 includes an input shaft 80a which is an axial extension of the counter shaft 76 of the primary transmission 70, the intermediate gear 40 extending parallel to the input shaft 80a and having the bevel gear 40a on its inner end, low- and high-speed gears axially immovably splined to the input shaft 80a and the intermediate shaft 40, and reverse gears axially movably fitted over the shafts 80a, 40 between the low- and high-speed gears.

Drive power transmitted to the intermediate shaft 40 is transmitted through the bevel gear 39a held in mesh with the bevel gear 40a on the intermediate shaft 40 at all times to the output shaft 39 of the transmission 7, which is oriented longitudinally of the motor vehicle.

With the drive train thus arranged, the output shaft 39 is disposed substantially on the longitudinal central axis of the engine 6, and hence on the longitudinal central axis of the motor vehicle body.

Drive power from the engine 6 is thus transmitted to the output shaft 39, from which the drive power is transmitted through the universal joint 36, the drive shaft 35, and the bevel gear 38 to the bevel gear 16 of the final output mechanism 15. On rotation of the bevel gear 16, the drive axle 8 and hence the driving wheels 4, 5 are driven to rotate.

Since the drive shaft 35 and the drive shaft cover 41 are positioned behind the front wheel 3 and lie above the path of travel of the front wheel 3, the drive shaft 35 and the drive shaft cover 41 are prevented from interfering with bumps on the ground, or stated otherwise, are protected from ground bumps while the motor vehicle is running on rough terrain.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

What is claimed is:

1. A shaft drive apparatus in a motor vehicle having an engine and driving wheels drivable by the engine, comprising:
    (a) an axle of the driving wheels;
    (b) a drive shaft for transmitting power from said engine to said axle;
    (c) final output means and brake means disposed adjacent to each other substantially axially centrally of said axle; and
    (d) said drive shaft being disposed between said final output means and said brake means.

2. A shaft drive apparatus according to claim 1, wherein said motor vehicle includes a vehicle body, said drive shaft being disposed substantially on a longitudinal central axis of said vehicle body.

3. A shaft drive apparatus according to claim 2, wherein said vehicle has a drive train connected to said engine and having an output shaft, said final output means including a final gear rotatable in unison with said axle, said drive shaft having an end coupled to said output shaft of said drive train and an opposite end meshing with said final gear.

4. A shaft drive apparatus according to claim 3, including a gear case covering said final output means, and a brake case covering said brake means, said gear case and said brake case being securely coupled with each other, said opposite end of said drive shaft being rotatably supported on said gear case.

* * * * *